Figure 1:
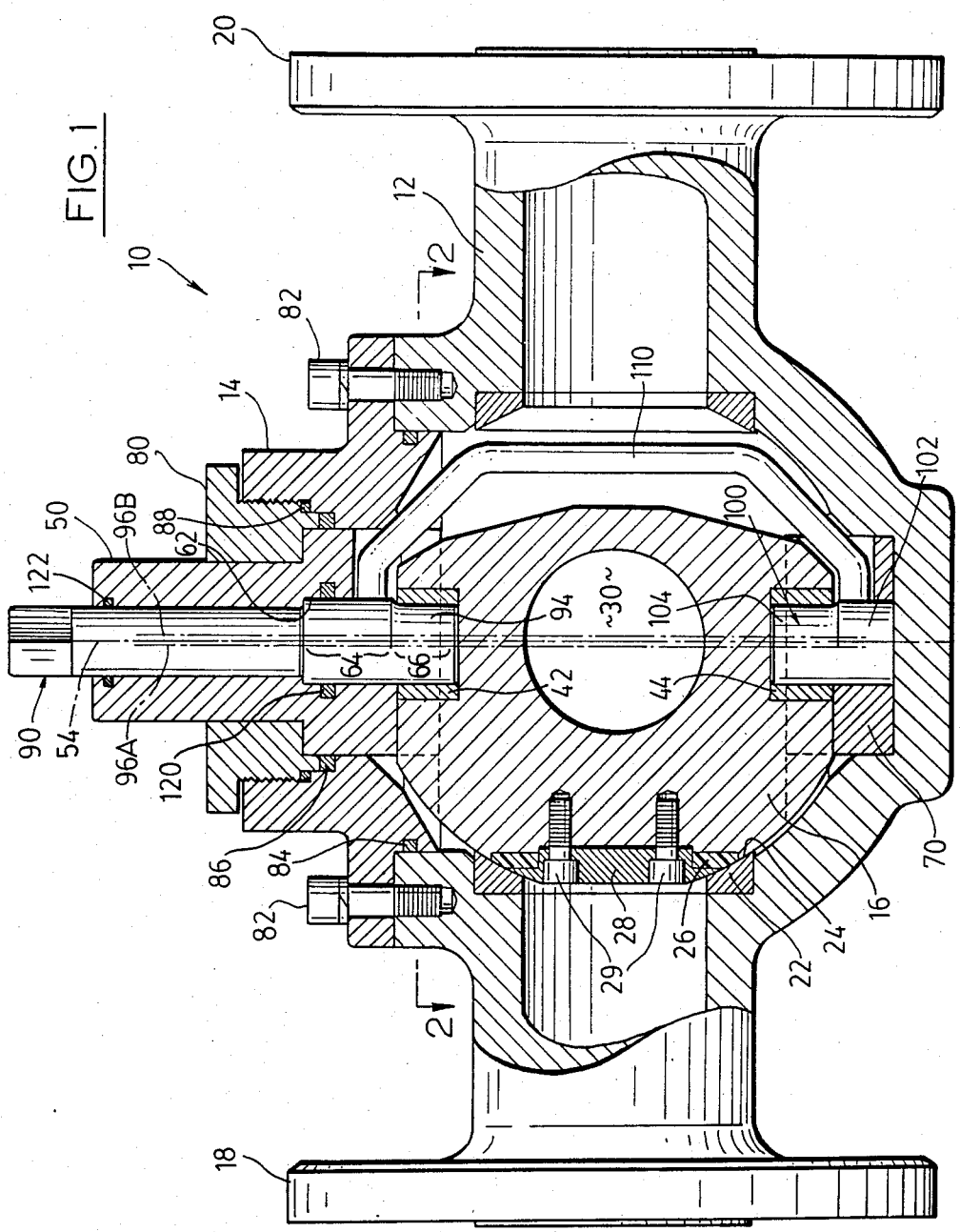

United States Patent [19]

Varden

[11] Patent Number: 4,634,098

[45] Date of Patent: Jan. 6, 1987

[54] BALL VALVE

[75] Inventor: Arnold Varden, Barrie, Canada

[73] Assignee: 596801 Ontario Limited, Toronto, Canada

[21] Appl. No.: 848,517

[22] Filed: Apr. 7, 1986

Related U.S. Application Data

[63] Continuation of Ser. No. 589,920, Mar. 15, 1984, abandoned.

[51] Int. Cl.⁴ ............................................. F16K 25/00
[52] U.S. Cl. .................................... 251/188; 137/559; 251/315; 251/316
[58] Field of Search ............... 251/161, 188, 192, 315, 251/316; 137/559

[56] References Cited

U.S. PATENT DOCUMENTS

| | | | |
|---|---|---|---|
| 1,236,297 | 8/1917 | Hansen | 251/317 |
| 1,442,452 | 1/1923 | Taylor | 251/161 |
| 3,284,046 | 11/1966 | Allenbaugh, Jr. | 251/315 |
| 3,339,884 | 9/1967 | Smith et al. | 251/161 |
| 3,429,553 | 2/1969 | Smith et al. | 251/161 |
| 3,473,554 | 10/1969 | King | 251/315 |
| 3,625,478 | 12/1971 | Killian | 251/188 |
| 3,653,631 | 4/1972 | Hurst | 251/188 |
| 3,893,469 | 7/1975 | Baker | 251/315 |
| 3,941,351 | 3/1976 | Graham | 251/161 |
| 4,029,292 | 6/1977 | Kramer et al. | 251/188 |
| 4,141,536 | 2/1979 | Graham | 251/161 |
| 4,174,090 | 11/1979 | Nelimarkka | 251/315 |
| 4,174,825 | 11/1979 | Nelimarkka | 251/315 |
| 4,273,152 | 6/1981 | Freeman | 137/559 |

Primary Examiner—Martin P. Schwadron
Assistant Examiner—Sheri M. Novack
Attorney, Agent, or Firm—Rogers, Bereskin & Parr

[57] ABSTRACT

In a valve of the ball or globe type operating means are provided to cause movement of the closure member in an angular mode about an axis of rotation and in a radial direction with respect to such axis in order that the closure member may be removed from the seat prior to subtantial angular movement. The operating means comprises two concentric stems one of which comprises an eccentric portion journalled with the closure member which eccentric portion provides the radial movement. The housing comprises an inspection port against which the closure member may be sealed while the valve remains open permitting inspection and replacement of the main seal through the inspection port while fluid continues to flow through the valve.

13 Claims, 4 Drawing Figures

BALL VALVE

This is a continuation of application Ser. No. 589,920 filed Mar. 15, 1984, now abandoned.

This invention relates in general to the construction of valves and in particular to a new housing containing a closure member of the ball valve type wherein the closure member is carried on an eccentric so as to permit angular movement of the closure member about an axis and in addition, radial movement with respect to that axis.

The present invention relates to the construction of a ball or globe valve, particularly for use in shutting off pipelines and the like. Ball valves are known generally. They have several advantages including being relatively economical to manufacture and requiring relatively little maintenance. One of the disadvantages of ball valves is that the valves are often used on high pressure lines such as gas and oil transmission lines and thus require a significant amount of force between the ball and the seat against which the ball seals. Angular movement of the ball with respect to its seat causes failure of the seal whether the seal is carried by the ball or the seat. When the seal fails the pipeline must be shut down and the valve entirely disassembled to replace the seat.

Various attempts have been made to provide closure members of the ball valve type in which the closure member moves in a direction axial to the seat before any angular movement so as to relieve the sealing pressure prior to the angular movement. While such valves have extended life there still remains the necessity of shutting down the pipeline and completely disassemblying the valve in order to repair or inspect the seating surface.

According to the present invention there is provided a valve of the ball or globe type in which the housing comprises an inlet, an outlet and an inspection or maintenance port. The closure member is contained within the housing and comprises a sealing surface co-operating with a seat rounding the inlet for shutting off flow through the valve. Operating means are provided to cause movement of the closure element in two different directions. To open the valve the closure member is moved firstly in a direction away from the seat carried by the inlet. The valve may then be rotated through a convenient angle about an axis to a second position in which the passage through the closure member is in fluid communication with the inlet and the outlet. When in the second position the seating surface of the closure member is adjacent to and aligned with the inspection port. The closure member may then be moved in a direction radial to the axis of angular movement towards the inspection port to seal against the inspection port. When in the latter position the valve is open permitting flow through the line while at the same time the main seal is available through the access port for inspection and repair.

In a preferred embodiment the operating mechanism for the closure member comprises a main stem to give angular displacement of the closure member about the axis and an auxiliary stem to give the radial displacement. The auxiliary stem is contained within and is concentric with the main stem. The auxiliary stem comprises an eccentric portion journalled in the closure member. The main stem has a yoke-shaped end which co-operates with a boss on the closure element permitting relative sliding between the yoke and boss during radial movement.

Figure 2:
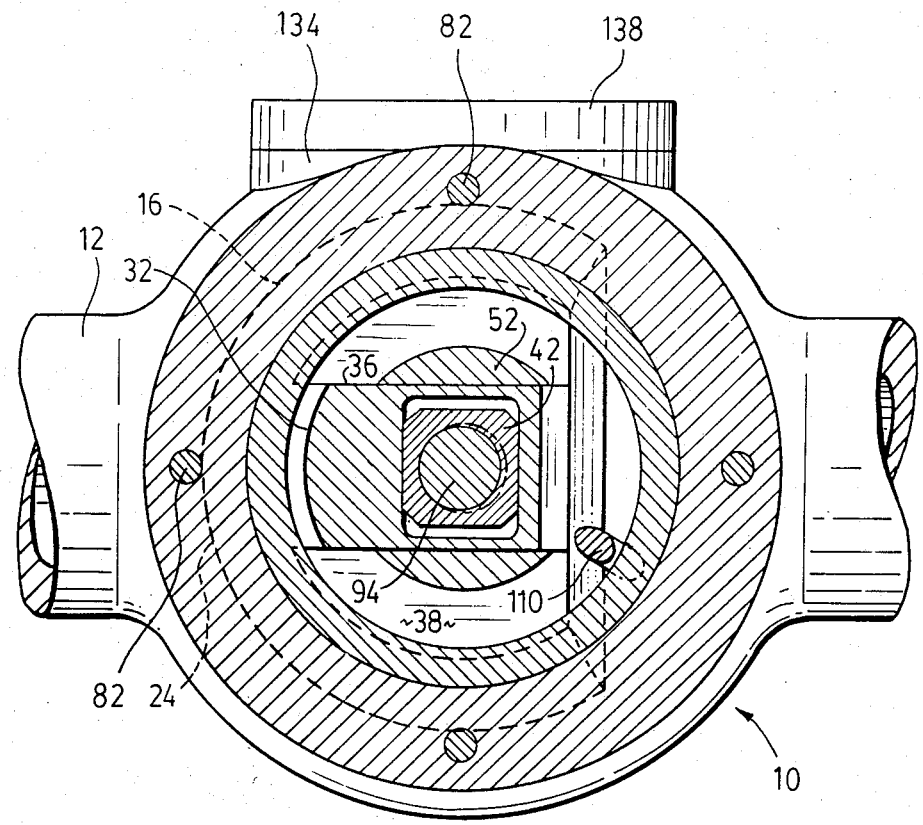
Figure 3:
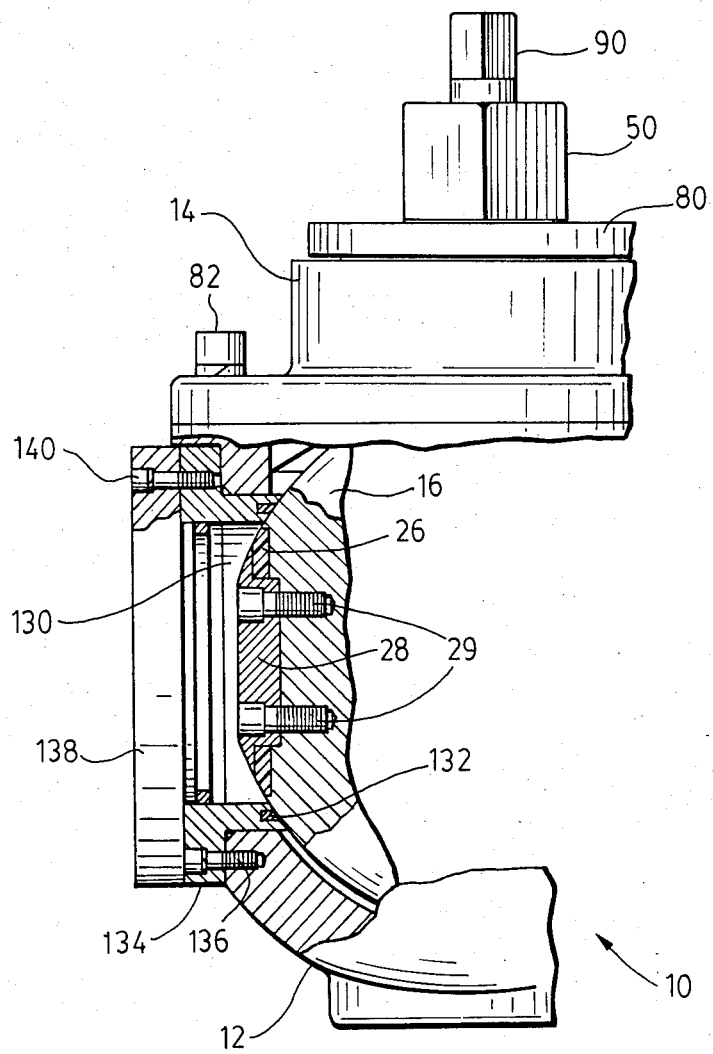
Figure 4:
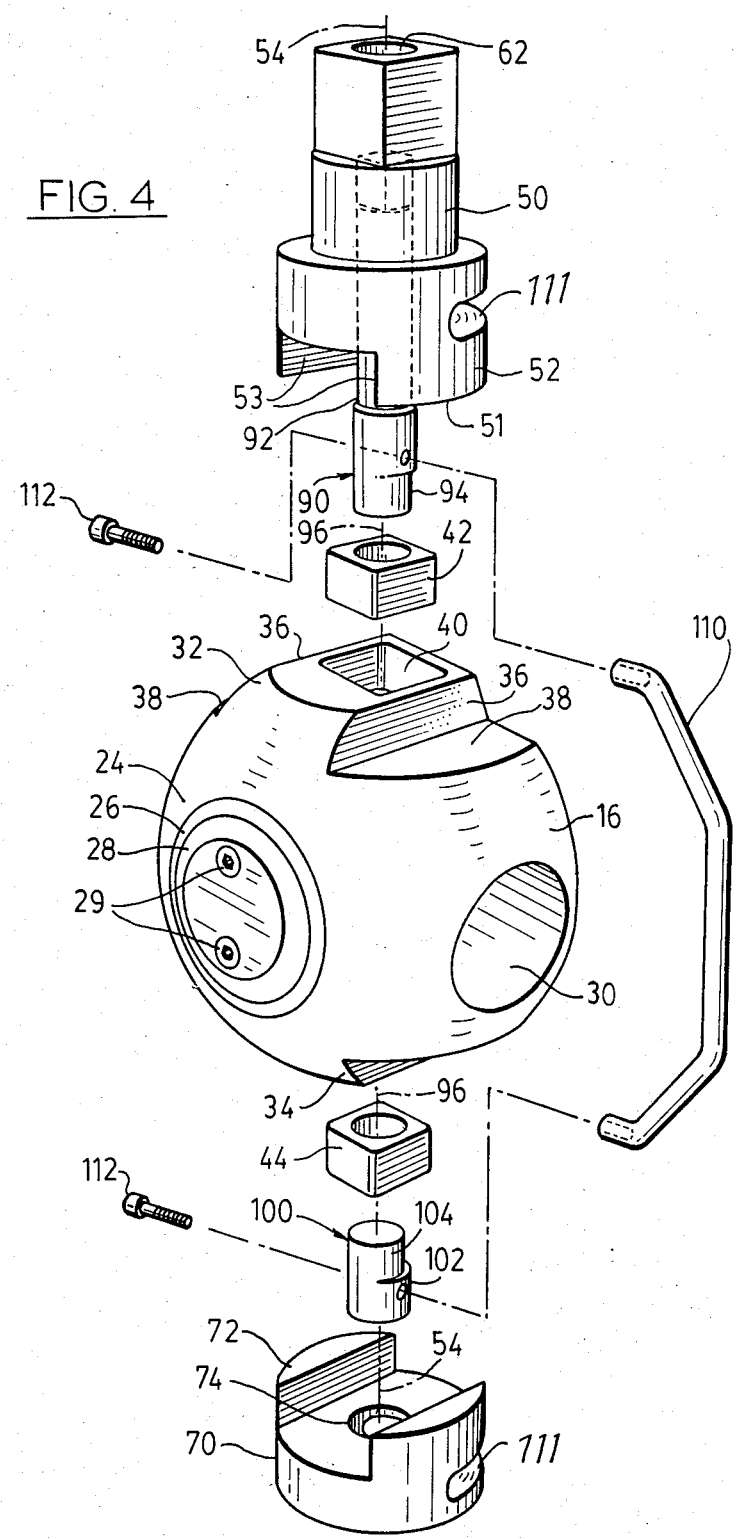

The invention is further explained below and in the enclosed drawings in which:

FIG. 1 is a vertical sectional view through a preferred embodiment of the invention, FIG. 2 is a horizontal sectional view taken along line 2—2 of FIG. 1, FIG. 3 is a partial sectional view illustrating the device of FIG. 1 in the open position permitting flow with the closure member sealed against the inspection port, and FIG. 4 is an exploded perspective view of the closure member and its operating mechanism.

Referring to the drawings in particular, the embodiment illustrated therein comprises a ball valve indicated generally at 10 comprising a main housing 12, and upper housing 14 and a closure member 16.

The main housing 12 comprises an inlet flange 18 and an outlet flange 20 in order that the ball valve may be connected to a pipeline in the standard fashion. The inlet flange and outlet flange together with the main housing respectively define inlets and outlets having passages for fluid flow.

The main housing 12 comprises a valve seat 22 illustrated in FIG. 1 against which the closure member seals to prevent flow along the fluid passage. The closure member 16 comprises a surface 24 for co-operating with the valve seat 22. The surface 24 has inset therein an annular neoprene main seal 26. Main seal 26 is maintained within the surface 24 of the closure member 16 by a main seal retainer 28 which is affixed to closure member 16 by means of countersunk bolts 29. The interaction between valve seat 22 and neoprene main seal 26 provides the main sealing interface between the closure member 16 and the main housing 12. In FIG. 1 the valve is shown in the closed position.

The closure member 16 is illustrated in exploded perspective view in FIG. 4. The closure member 16 comprises a central passage 30 extending therethrough for communication of fluid flow between the inlet and outlet portions of the housing. As shown in FIG. 1 the passage 30 is of approximately the same internal diameter as the inlet and outlet passages of main housing 12.

The closure member 16 is substantially spherical shaped in the region of the surface 24. The remainder of the surface may be relieved from the spherical outline to provide a lighter more compact and more inexpensive closure member. The upper and lower portions of the closure member 16 as illustrated in FIG. 4 comprise boss structures 32 and 34 respectively. As illustrated in FIG. 4 upper boss 32 is defined by a pair of flat surfaces 36 and a pair of flat surfaces at right angles thereto 38. Lower boss 34 is similarly defined by a pair of flat surfaces on either side and a second pair of flat surfaces at right angles thereto.

Upper boss 32 comprises a rectangular chamber 40 for receiving upper journal bearing 42. Upper journal bearing 42 is closely received by chamber 40 so as to preclude any relative movement therebetween.

Lower boss 34 also comprises a chamber, not visible, which chamber, similarly, closely receives lower journal bearing 44.

Angular motion of the closure member 16 about an axis is provided by movement of main stem 50. As illustrated in FIG. 4 the end of main stem 50 adjacent closure member 16 comprises a cylindrical yoke 52 having a flat lower surface 51 and flat internal surfaces 53. The yoke 52 of main stem 50 is closely received by boss 32 so that the lower surface 51 of the main stem rests against surfaces 38 while the internal surfaces 53 of the yoke are closely adjacent surfaces 36. Thus rotation of the main stem about its axis 54 will rotate the closure member 16 about that same axis.

Lower main stem 70 is similarly provided with a yoke-shaped end 72 which accommodates lower boss 34. As illustrated in FIG. 1 lower main stem 70 is rotatably received in main housing 12 to support and locate the closure member 16. Upper main stem 50 is received in and located by upper housing 14 thus providing support for the closure member 16. The upper main stem is retained in upper housing 14 by means of threaded cap 80 which is threadedly received in upper housing 14.

Upper housing 14 is retained in main housing 12 by means of bolts 82. An O-ring seal 84 on upper housing 14 serves to seal upper housing 14 to main housing 12. A pair of seals or gaskets 86 and 88 are compressed by the end cap 80 and serve to seal end cap 80 to upper housing 14.

From reference to FIGS. 1 and 4 it will be appreciated that main stem 50 comprises a hollow bore 62 the upper part of which is co-axial with axis 54. The mid portion 64 of bore 62 comprises a bore of larger diameter. The lowermost portion 66 of bore 62 comprises an eccentric bore having an axis offset from and parallel to axis 54.

An upper auxiliary stem 90 is provided in order to achieve radial motion of the closure member 16 with respect to axis 54. The upper auxiliary stem 90 comprises a cylindrical shaft which is receivable in bore 62. The uppermost portion 92 is concentric with axis 54. The lowermost portion 94 of the upper auxiliary stem 90 comprises a cylindrical shaft with the axis 96 of this lower portion parallel to but spaced from the axis 54 thereby providing an eccentric. The lowermost portion 94 of the upper auxiliary stem 90 is closely received within a bore in upper journal bearing 42.

The lower main stem 70 also comprises a central bore 74 which bore is co-axial with axis 54. Lower auxiliary stem 100 comprises a first cylindrical portion 102 which is received within bore 74 of lower main stem 70. The lower auxiliary stem 100 also comprises an upper cylindrical portion 104 which is co-axial with axis 96. The upper cylindrical portion 104 of lower auxiliary stem 100 is received within the bore of the lower journal bearing 44.

Upper auxiliary stem 90 is connected to lower auxiliary stem 100 by means of connecting bar 110. Connecting bar 110 is affixed to upper auxiliary stem 90 and lower auxiliary stem 100 by means of bolts 112. These bolts have not been illustrated in FIG. 1 in order to provide further clarity of the bearing details in that sectional view.

In order to understand the operation of the operating means, reference should be had to FIG. 1. In FIG. 1 the valve is shown in the closed position. In order to open the valve a suitable valve wrench is applied to upper auxiliary stem 90 to turn upper auxiliary stem 90 about axis 54 approximately ½ turn. Movement of upper auxiliary stem 90 will cause similar movement of lower auxiliary stem 100 as these stems are interconnected by the connecting bar 110. Upper main stem 50 and lower main stem 74 each comprise a horizontal slot 111 to accommodate the movement of connecting bar 110. [In FIG. 1 the closure member is shown in the closed position but connecting bar is shown in the "half way " position so as to show the connecting bar more clearly.] Each of upper auxiliary stem 90 and lower auxiliary stem 100 will achieve angular movement about axis 54 as upper auxiliary stem 90 is received within the main stem 50 and lower auxiliary stem 100 is received within lower main stem 70. The lowermost portion 94 of upper auxiliary stem will thus move eccentrically about axis 54. The uppermost portion 104 of lower auxiliary stem 100 will similarly move eccentrically about axis 54. In FIG. 1 the numeral 96A is used to designate the axis 96 of portions 94 and 104 when in the closed position while the numeral 96B is used to denote the position of the axis 96 following movement of auxiliary stems 90 and 100. The movement of portions 94 and 104 from position 96A to 96B causes movement of the journal bearings 42 and 44 to the right in FIG. 1. As the journal bearings 42 and 44 are tightly received within the closure member 16, the closure member 16 must also move to the right a similar distance. The closure member 16 is free to move to the right under such motion by sliding the bosses 32 and 34 to the right within yoke 52 of main stem 50 and yoke 72 of lower main stem 70. Accordingly the closure member 16 will be drawn to the right in FIG. 1 so that the annular seal 26 is withdrawn from the valve seat 22. This is achieved by approximately 180 degrees rotation of the upper auxiliary stem 90.

The second stage in the opening of the valve is the rotation of the main stem 50. Rotation of the main stem 50 through an angle of approximately 90 degrees will cause rotation of the closure member 16 about axis 54 to bring the passage 30 into registration with the inlet and outlet passages of the housing. Thus the valve is in the opened position with fluid flowing through the housing and the closure member 12 not sealed against either the inlet or outlet passages. When in this configuration fluid pressure will fill the housing but there will be no substantial flow around the exterior surface of the closure member 16. Leakage of fluid along the bore 66 of the main stem is prevented by O-ring seals 120 and 122 illustrated in FIG. 1.

FIG. 3 illustrates the valve with the closure member 16 in the position to be inspected. When the valve is in the open position with passage 30 registering with the inlet and outlet passages of the housing 12 the upper auxiliary stem 90 may be moved back through 180 degrees. Such movement will cause radial movement of the closure member 16 with respect to axis 54 toward the maintenance port 130. FIG. 2 illustrates that the maintenance port 130 is most advantageously at an angle of 90 degrees to the inlet and outlet passages. When the closure member 16 is moved toward the maintenance port 130 a portion of the surface 24 seats against a maintenance seal 132. Maintenance seal 132 is an annular member set into the surface of a maintenance seal retainer 134. Maintenance seal retainer 134 is affixed to main housing 12 by means of countersunk bolts 136. The maintenance port is closed by means of a maintenance cover plate 138 which is affixed to the maintenance seal retainer by means of countersunk bolts 140.

It will be observed by reference to FIG. 3 that the maintenance port 130 is of larger diameter than the main seal 26. When inspection or replacement of main seal 26 is required the closure member 16 is moved to the position illustrated in FIG. 3. Maintenance cover plate 138 is removed by removing countersunk bolts 140. The main seal 26 may then be inspected by viewing through maintenance port 130. If replacement of the main seal is required the bolts 29 may be removed in order that the main seal retainer 28 can be taken out. Upon removal of the bolts 29 and the main seal retainer 28 the main seal 26 may be replaced.

As the closure member 16 is sealed against the maintenance seal 132 the chore of inspecting and replacing the main seal 26 is conducted while the valve is in the open position and fluid is flowing through the pipeline. Thus, the device of this invention provides a mechanism by means of which the main seal may be inspected and replaced without the necessity of shutting down the pipeline.

It is expected that the maintenance seal 132 will have particularly long life. However, if it becomes necessary to replace maintenance seal 132 then the valve must be moved to the closed position illustrated in FIG. 1. When in the position illustrated in FIG. 1 the maintenance cover plate may be removed and the maintenance seal retainer may be removed by removing countersunk bolts 136. The maintenance seal 132 may then be replaced in the maintenance seal retainer 134.

Assembly of the entire device may be appreciated with reference to FIG. 4. The valve seat 22 is first placed in position within the main housing 12. Next the lower main stem 70 is inserted into housing 12.

The next step in the assembly process is to subassemble the closure member and the upper and lower auxiliary stem. Firstly, the lower journal bearing 44 and the upper journal bearing 42 are placed in the bosses 34 and 32 respectively. Then lower auxiliary stem 100 is seated within the lower journal bearing 44. This is followed by insertion of upper auxiliary stem 90 into upper journal bearing 42. Connecting bar 110 is then bolted to the upper auxiliary stem 90 and the lower auxiliary stem 100 using bolts 112. At this time, the subassembly may then be inserted in the main housing 12 with the lower auxiliary stem 100 being seated in the lower main stem 70 and the boss 34 being received within the yoke 72.

With the subassembly in place the upper main stem 50 may be passed downwardly over the upper auxiliary stem 90 with the yoke 52 of the upper main stem 50 straddling the boss 32. Thereafter the housing may be closed by bolting the upper housing 14 in place and then screwing on end cap 80.

The maintenance port may be disassembled and assembled as indicated above at any time as convenient.

While a specific embodiment of the invention has been shown and described in detail to illustrate the application of the principles of the invention, various changes and modifications to the specific structures described may be made without departing from such principles.

I claim:

1. A valve for use in a pipeline comprising; a housing; said housing having an inlet, an outlet and an internal chamber to accommodate a closure member and an inspection port;
   a closure member contained within said housing, said closure member and said housing having co-operating sealing means for sealing said inlet;
   said closure means movable from a closed position blocking fluid flow through said valve to an open position permitting fluid flow through said valve;
   operating means to move said closure member, including main means to move said closure member angularly about an axis and auxiliary means to move said closure member radially with respect to said axis;
   said means to move said closure member angularly including an upper main stem and a lower main stem,
   said upper main stem and said lower main stem located on opposite sides of said closure member;
   said means to move said closure member radially including an upper auxiliary stem, and a lower auxiliary stem,
   said upper auxiliary stem and said lower auxiliary stem located on opposite sides of said closure member, and
   a connecting bar contained within said housing and connecting said upper auxiliary stem and said lower auxiliary stem so that said upper auxiliary stem and said lower auxiliary stem may be moved simultaneously.

2. The valve of claim 1 wherein said closure member carries a replaceable seal for co-operating with said housing for sealing said inlet and movement of said operating means causing angular movement of said closure means about said axis is adapted to bring said replaceable seal into alignment with said inspection port whereby said replaceable seal may be replaced through said inspection port.

3. The valve of claim 1 wherein said closure member comprises a surface for co-operatively sealing against said inspection port.

4. The valve of claim 3, said upper and lower stems of said main operating means comprising a cylindrical stem having a concentric bore to accommodate said respective stem of said auxiliary operating means, each said stem of said auxiliary operating means comprising a cylindrical stem of at least two parts, one part of which is concentric with respect to said stem of said main operating means and another part of which is a cylindrical stem having an axis eccentric with respect to said stem of said main operating means.

5. The valve of claim 4 wherein said eccentric part of said auxiliary operating means is journalled in bearing means carried in said closure member.

6. The valve of claim 5 said closure member comprising a boss for accommodating said main operating means, each said stem of said main operating means having a yoke end portion for accommodating said boss of said closure member whereby on radial movement of said closure member with respect to said axis, said boss may slide within said yoke.

7. The valve of claim 6 wherein said auxiliary operating means comprises a first cylindrical stem with an eccentric part journalled in bearing means carried in said closure member and a second cylindrical stem with at least two parts one of which is concentric with respect to said stem of said main operating means and another part which is cylindrical and has an axis eccentric with respect to said stem of said main operating means.

8. The valve of claim 7, each said main stem defining a slot to accommodate movement of said connecting bar upon relative movement of said main stems with respect to said auxiliary stems.

9. The valve of claim 8 further comprising a maintenance seal retaining member mounted in said inspection port of said housing, a maintenance seal carried by said maintenance seal retaining member, said maintenance seal adapted to seal against said closure member and a cover plate for sealing said inspection port.

10. The valve of claim 9, said closure member having a sealing surface, a first portion of said sealing surface comprising an annular main seal for sealing against said inlet, a second portion concentric with said annular seal for sealing against said maintenance seal; said maintenance seal comprising an annular member having an inner diameter larger than the outer diameter of said annular main seal.

11. A valve for use in a pipeline comprising; a housing, said housing having an inlet and an outlet, a closure member contained within said housing said closure member and said housing having co-operating sealing means for sealing said inlet, said closure member having an axial passage therethrough for flow of fluid, operating means to move said closure member from a sealing position in which fluid can not flow through the valve to an open position in which said axial passage of said closure member is in fluid communication with said inlet and said outlet; said operating means comprising upper and lower portions each such portion having first and second cylindrical stems concentric with respect to a first axis, said second stems having a cylindrical portion with an axis parallel to but spaced from said first axis, said cylindrical portion of said second stems journalled in said closure member, said first stems having a yoke-shaped end portion, said closure member having a boss for slidably engaging said yoke-shaped portions and a bar within said housing and connecting said second stems.

12. The valve of claim 11 said housing comprising an inspection port and sealing means adapted to seal against said closure member for sealing said inspection port.

13. The valve of claim 12 further comprising a cover plate closing said inspection port, said co-operating sealing means of said closure member being available for inspection and repair through said port upon removal of said cover plate when said closure element is in said open position and sealed against said inspection port.

* * * * *